(12) United States Patent
Destro et al.

(10) Patent No.: US 9,150,701 B2
(45) Date of Patent: Oct. 6, 2015

(54) NANO STRUCTURED UV ABSORBERS

(75) Inventors: Mara Destro, Bologna (IT); Samanta Cimitan, Ponte Di Piave (IT); Cesare Lorenzetti, Grottammare (IT); Dario Lazzari, Bologna (IT)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/747,194

(22) PCT Filed: Dec. 12, 2008

(86) PCT No.: PCT/EP2008/067366
§ 371 (c)(1),
(2), (4) Date: Sep. 15, 2010

(87) PCT Pub. No.: WO2009/080548
PCT Pub. Date: Jul. 2, 2009

(65) Prior Publication Data
US 2011/0015297 A1 Jan. 20, 2011

(30) Foreign Application Priority Data
Dec. 21, 2007 (EP) .................................... 07150289

(51) Int. Cl.
*C08K 3/22* (2006.01)
*C08K 5/3492* (2006.01)
(Continued)

(52) U.S. Cl.
CPC . *C08K 3/22* (2013.01); *B82Y 30/00* (2013.01); *C08K 5/34* (2013.01); *C08K 2201/011* (2013.01); *C08L 21/00* (2013.01)

(58) Field of Classification Search
None
See application file for complete search history.

(56) References Cited

U.S. PATENT DOCUMENTS

| 6,117,995 A * | 9/2000 | Zedda et al. .................. 544/207 |
| 6,337,362 B1 * | 1/2002 | Reynolds et al. ............. 523/442 |

(Continued)

FOREIGN PATENT DOCUMENTS

| EP | 1 308 084 A | 5/2004 |
| EP | 1 609 816 A | 12/2005 |

(Continued)

OTHER PUBLICATIONS

Stabilizer Systems as UV Filters, IP.com, Dec. 20, 2002, Ciba Speciality Chemicals.*

(Continued)

*Primary Examiner* — James J Seidleck
*Assistant Examiner* — Peter A Salamon
(74) *Attorney, Agent, or Firm* — Oblon, McClelland, Maier & Neustadt, L.L.P.

(57) ABSTRACT

The present invention relates to an UV absorbing polymer composition comprising effective amounts of (a1) a nanoparticulate oxide selected from oxides of the groups 4 and 12 of the periodic table, wherein the oxide is doped with In, Ga and/or Al, and (b1) a UV stabilizing/absorbing substance comprising a sterically hindered amine and/or a polymeric hydroxyphenyltriazine; or (a2) a nanoparticulate oxide selected from oxides of the groups 4 and 12, and (b2) a UV light stabilizing substance comprising a N-oxygen-substituted sterically hindered amine. Furthermore, the present invention relates to a polymer comprising said composition and the use of said composition as a UV absorber in polymers, particularly in agricultural films or packaging films. Finally, the present invention relates to a process for producing doped nanoparticulate metal oxides.

13 Claims, 2 Drawing Sheets

(51) Int. Cl.

| | |
|---|---|
| *C08K 5/00* | (2006.01) |
| *C08K 5/17* | (2006.01) |
| *B82Y 30/00* | (2011.01) |
| *C08K 5/34* | (2006.01) |
| *C08L 21/00* | (2006.01) |

(56) References Cited

U.S. PATENT DOCUMENTS

| | | | | |
|---|---|---|---|---|
| 7,037,962 | B2* | 5/2006 | Destro et al. | 524/89 |
| 7,244,775 | B2* | 7/2007 | Ilenda et al. | 523/202 |
| 7,294,714 | B2* | 11/2007 | Lazzari et al. | 544/216 |
| 7,538,130 | B2* | 5/2009 | Campbell et al. | 514/374 |
| 7,754,825 | B2* | 7/2010 | McKenna et al. | 525/448 |
| 2002/0086924 | A1* | 7/2002 | King, III | 524/237 |
| 2004/0087446 | A1 | 5/2004 | Destro | |
| 2006/0148944 | A1 | 7/2006 | Baumgart | |
| 2006/0173106 | A1* | 8/2006 | McKenna et al. | 524/100 |
| 2007/0072964 | A1* | 3/2007 | Campbell et al. | 524/90 |
| 2007/0145358 | A1 | 6/2007 | Yasuda | |
| 2011/0089384 | A1* | 4/2011 | Lazzari et al. | 252/588 |

FOREIGN PATENT DOCUMENTS

| | | | |
|---|---|---|---|
| JP | 2003054947 | A | 2/2003 |
| JP | 2003325060 | A | 11/2003 |
| JP | 2007507567 | A1 | 3/2007 |
| WO | 2005/072680 | A | 8/2005 |
| WO | WO 2005072680 | A2 * | 8/2005 |
| WO | 2006083817 | A1 | 8/2006 |

OTHER PUBLICATIONS

Copending U.S. Appl. No. 12/223,141, filed Jul. 23, 2008.
Copending U.S. Appl. No. 12/308,354, filed Dec. 12, 2008.
Copending U.S. Appl. No. 12/308,353, filed Dec. 12, 2008.
The IP.com 000010602D Journal, V3N1 pp. 199-233.
English Language ABST/TRANS of JP2003054947 Feb. 26, 2003.
English Language ABST/TRANS of JP2003325060 Nov. 18, 2003.

* cited by examiner

NANO STRUCTURED UV ABSORBERS

The present invention relates to an UV absorbing composition comprising (a1) a nanoparticulate metal oxide selected from oxides of the groups 4 and 12 of the periodic table, wherein the metal oxide is doped with a doping element selected from groups 13, 14 and 17 of the periodic table, preferably selected from In, Ga and/or Al, and (b1) a UV light stabilizing substance comprising a sterically hindered amine and/or UV absorbing substance comprising a polymeric hydroxyphenyltriazine; or (a2) a non-doped nanoparticulate oxide and (b2) a UV light stabilizing substance comprising a N-oxygen-substituted sterically hindered amine. Furthermore, the present invention relates to a polymer comprising said composition and the use of said composition as a UV absorber in polymers, particularly in agricultural films or packaging films. Finally, the present invention relates to a process for producing doped nanoparticulate metal oxides.

The use of UV absorbers for the protection of bottles and film contents is well known. However there is a trend towards the use of clear or lightly colored containers. More aesthetically pleasing containers may be formed from clear plastics which also allow one to view the contents. Unfortunately, clear and lightly colored containers and films allow the transmission of significant portions of ultraviolet light, i.e. light in the range of about 280 to about 400 nm. Further, there is a trend towards more light-weight and hence thinner walled containers. Thin-walled containers, by virtue of a shorter path length, will allow more UV light to pass. Due to these trends in packaging there is a need for more efficient UV absorbers for use in this area.

It is however known e.g. from WO 03/099911 that the ability of nanoparticulate UV absorbers is restricted as they do not screen the entire UV interval. Both the metal oxide band-gap value and the material particle size are fundamental for the coverage of the whole UV range and for the efficiency of absorbance respectively. In addition, particle size and the exact material composition strongly influence the properties of the nanoparticulate UV absorbers.

Additionally, agricultural films in particular (e.g. greenhouses films) are one of the most critical applications for plastics due to the harsh conditions in terms of solar radiation exposure and negative effects of pesticides used to control plant diseases. Many stabilizing systems have been used to protect the plastic from the ultraviolet radiation in combinations with hindered amines stabilizers or nickel singlet oxygen quenchers, among them benzophenones derivatives as Chimassorb 81, benzotriazoles (Tinuvin 326, Tinuvin 327, Tinuvin 328), hydroxyphenyl triazines (Cyasorb 1164) have been extensively used.

All these UV absorbers have limits in agricultured applications: benzophenones and benzotriazoles are for example relatively volatile and they are quickly lost due to evaporation or migration outside of the plastic films.

Hydroxyphenyl triazines are much more persistent in terms of volatility but they suffer of a low chemical resistance against pesticides. As an example, elemental sulphur is extensively used in agriculture and tends to interact with plastic materials decreasing significantly their life and hydroxyphenyl triazines in particular are quickly degraded even in presence of low amounts of sulphur. It has been supposed that sulphur may attack even the hindered amines in presence of UV light deactivating them in very short times.

Based on the above considerations, the need for a new stabilizing composition with improved UV absorption and fastness becomes clear. Recently, the attention for inorganic nanoparticles has grown and the use of nanoparticulate UV absorbers has been reported. Nanoparticulate metal oxides and organic UV absorbers are e.g. described in U.S. Pat. No. 6,337,362 and WO 96/09348.

Nevertheless traditional inorganic wide band gap semiconductors as titanium dioxide show a pronounced widening in the band gap when the particles are smaller of about 100 nm, this means that the absorption shifts at higher energies. Unfortunately this band gap broadening leads to a worse coverage of the UV region of the solar spectrum. Furthermore, said UV absorber did not show sufficient resistance against sulfur, in particular against sulfur containing pesticides. In addition, the polymer films used in the prior art as agricultural materials do often not provide sufficient protection for crops against virus and fungi attacks. Hence, the UV absorbing compositions comprising inorganic nanoparticulate oxide and organic UV absorber disclosed in the prior art still require improvement.

Therefore, it was the object of the present invention to provide a composition, which can be advantageously used as UV stabilizing agent in organic polymers. In particular, the composition should be able to improve the aging behaviour of a polymer in the presence of pesticides, particularly in the presence of sulfur containing pesticides. Furthermore, the composition of the present invention should be able to stabilize polymers, in particular LDPE, against aging at intense and/or prolonged sun light exposure.

Furthermore, it was an object of the invention to provide polymers, having the following benefits:

optical transparency;
UV light protection in the wavelength range from 280 nm to 400 nm;
essentially no migration of additives;
resistance against sulfur.

The polymers of the invention should be useful for agricultural materials and should provide protection for crops against virus and fungi attacks. Consequently, a preferred group of polymers are thermoplastic polymer films.

Moreover, it was an object of the present invention to provide an efficient process for producing doped nanoparticulate metal oxides.

Unexpectedly it was found that the above mentioned objects can be solved by a composition comprising either a doped nanoparticulate metal oxide and a specific organic UV light stabilizer/absorber selected from a sterically hindered amine and/or a polymeric hydroxyphenyltriazine or a non-doped nanoparticulate oxide and a specific organic UV light stabilizer selected from the group of N-oxygen-substituted sterically hindered amines.

Hence, the present invention concerns a composition (particularly a UV absorbing and stabilizing composition), comprising (a1) a nanoparticulate metal oxide selected from oxides of the groups 4 and 12 of the periodic table, wherein the metal oxide is doped with a doping element selected from groups 13, 14 and 17 of the periodic table, preferably selected from In, Ga and/or Al, and and (b1) an organic UV light stabilizing substance comprising a sterically hindered amine and/or a UV absorbing substance comprising a polymeric hydroxyphenyltriazine or (a2) a nanoparticulate metal oxide selected from oxides of the groups 4 and 12, and (b2) an organic UV light stabilizing substance comprising an N-oxygen-substituted sterically hindered amine.

The nanoparticulate metal oxide (a1) or (a2) is selected from oxides of the groups 4 (also known as group IVA or titanium group) and group 12 (also known as group IIB or zinc group) of the periodic table, i.e. chosen from the group comprising Ti, Zr and Hf and from group comprising Zn, Cd and Hg. Furthermore, the present invention encompasses also mixtures of these metal oxides in the component (a1) or (a2).

In a preferred embodiment the nanoparticulate metal oxide (a1) or (a2) is selected from zinc oxide or titanium oxide. In particular, the nanoparticulate metal oxide (a1) or (a2) is selected from $TiO_2$ or ZnO.

Figure 1:
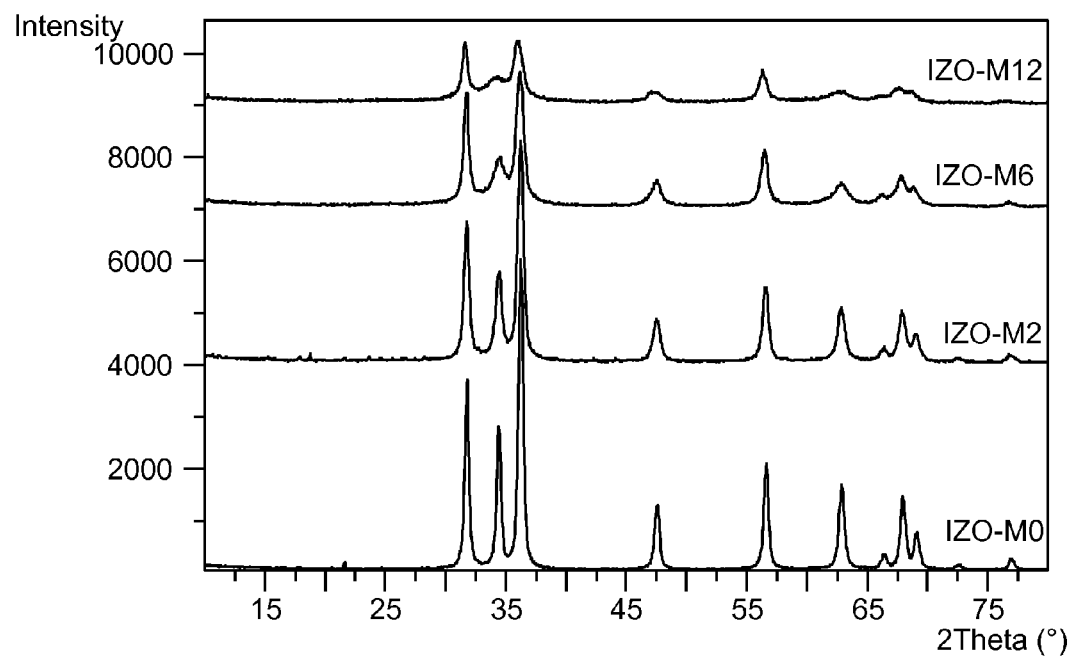
FIG. 1: XRD patterns of ZnO based samples synthesized in methoxyethanol at increasing In loadings: IZO-M0, In w/w%=0%; IZO-M2, In w/w%=2%; IZO-M6, In w/w%=6%; and IZO-M12, In w/w%=12%.

The nanoparticulate metal oxide is used in the present invention in two different embodiments. In the first embodiment the nanoparticulate metal oxide is doped with the above mentionend doping element, preferably with indium (hereinafter referred to as In), gallium (hereinafter referred to as Ga) and/or aluminium (hereinafter referred to as Al). The metal oxide of this embodiment is designated as compound (a1). In the second embodiment the nanoparticulate metal oxide is non-doped. The metal oxide of this embodiment is designated as compound (a2). Unless otherwise stated the term "nanoparticulate metal oxide" refers to both embodiments, i.e. component (a1) or (a2).

In component (a1) the nanoparticulate metal oxide is doped with a doping element selected from group 13 (also known as group IIIB or boron group), group 14 (also known as group IVB or carbon group) and group 17 (also known as group VIIB or halongenide group) of the periodic table. Suitable doping elements are for example boron, aluminum, gallium, indium, thallium, carbon, silicon, germanium, tin, lead, fluorine and/or iodine. Also silicon is possible. In are preferred embodiment the doping element is preferably selected from indium, gallium and/or aluminium, wherein indium and gallium are particularly preferred. Furthermore, also mixtures of the above mentioned doping elements are possible.

Generally, the term "nanoparticulate" means that the metal oxide is present in form of so-called nanoparticles. In the present invention nanoparticles can be understood as particles having a particle size of less than 1000 nm.

In a preferred embodiment the average particle size of the nanoparticulate metal oxide (a1) or (a2) is from 1 nm to 150 nm, preferably from 10 nm to 120 nm, more preferably from 20 to 110 nm. In another embodiment an average particle size of 80 to 120 nm is preferred and an average particle size of 90 nm to 110 nm is particularly preferred. This embodiment is particularly suitable when $TiO_2$ is used as metal oxide. In another embodiment an average particle size of 10 to 50 nm is preferred and an average particle size of 20 nm to 40 nm is particularly preferred. This embodiment is particularly suitable when ZnO is used as metal oxide.

Generally, particle sizes of metal oxides are determined in this application by Dynamic Light Scattering (DLS) using a Malvern Zeta Nano Sizer. For the analysis of the particle size the metal oxides are prepared as sols. The sols are diluted in methoxyethanol and sonicated in a ultrasonic bath for 10 minutes at 1600 watt power prior to the analysis. The hydrodynamic diameter measure given by the z-average value and the polydispersity index are taken as indicative results for the size of the particles.

Therefore, all particle sizes given in this application refer to the z-average particle size determined by the Dynamic Light Scattering (DLS) method.

In a preferred embodiment the nanoparticulate metal oxides have a polydispersity index (PI) of 0.01 to 0.2, more preferably from 0.05 to 0.15.

In a preferred embodiment the doped nanoparticulate metal oxide (component (a1)) comprises a doping element content of 0.1 to 15 wt.-%, preferably of 1 to 14 wt.-%, more preferably of 3 to 12 wt.-%, and most preferably of 4 to 10 wt.-%, based on the total weight of the doped nanoparticulate metal oxide. Preferably, the doped nanoparticulate metal oxide (component (a1)) comprises a metal content of In, Ga and/or Al of 0.01 to 15 wt.-%, preferably of 1 to 14 wt.-%, more preferably of 3 to 12 wt.-%, e.g. 4 to 10 wt.-%, based on the total weight of the doped nanoparticulate metal oxide.

In the first embodiment of the composition of the present invention, wherein component (a1) is used as doped nanoparticulate metal oxide, the composition of the present invention further comprises an organic UV stabilizing/absorbing substance selected from a sterically hindered amine and/or a polymeric hydroxyphenyltriazine. In the first embodiment said organic UV stabilizing/absorbing substance is referred to as component (b1).

In the second embodiment of the composition of the present invention, wherein component (a2) is used as nanoparticulate metal oxide, the composition of the present invention further comprises an organic UV stabilizing substance selected from an N-oxygen-substituted sterically hindered amine. In the second embodiment said organic UV stabilizing substance is referred to as component (b2).

Generally, doping of metal oxides such as ZnO or $TiO_2$ can be achieved by replacing the cations such as $Zn^{2+}$ or $Ti^{4+}$ with the cations of elements of other valency such as Ga, Al and In, thereby inducing changes in its electrical and optical properties. The efficiency of the doping element depends on its electronegativity and ionics radius but it is also strongly influenced by the synthesis method.

The present invention thus is also directed to a process for producing doped nanoparticulate metal oxides. Hence, a further subject of the present invention is a process for producing a nanoparticulate metal oxide selected from titanium oxide and zinc oxide, wherein the metal oxide is doped with In, Ga and/or Al, comprising the steps of (i) providing titanium compound or zinc compound, preferably in form of a solution of dispersion, (ii) adding a In, Ga and/or Al salt, selected from acetates, nitrates, hydroxides and halogenides, preferably in form of a solution of dispersion, (iii) heating the composition obtained and (iv) isolating the resulting nanoparticulate metal oxides.

Preferably, step (i) comprises titanium oxide or zinc oxide or mixtures thereof, preferably having the above mentioned preferred average particle size. Alternatively, also other titanium or zinc salts can be used. In particular, $Zn(CH_3COO)_2$ is preferred. The metal compounds can be solved or dispersed in a suitable solvent, preferably in an alcohol, e.g. methoxyethanol. The use of methoxyethanol allows a superior control of the resulting particle size.

In step (ii) an In, Ga and/or Al salt, selected from acetates, nitrates, hydroxides and halogenides, halogenides or mixtures thereof is added, preferably in form of a dispersion to the dispersion of step (i). Alternatively, the In, Ga and/or Al salts can be added to the dispersion of step (i) as a powder or the metal oxides and the In, Ga and/or Al salts can be mixed as powders and then be dispersed.

In step (ii) the addition of the following salts is preferred: Ga(NO$_3$)$_3$ (optionally in hydrate form) and/or In(CH$_3$COO)$_3$.

In step (iii) the composition is heated, preferably up to a temperature of 70° C. to 200° C., more preferably 100-170° C. Additionally, the heating might be carried out under pressure, e.g. under a pressure of 1.5 to 3 bar, more preferably from 2 to 3 bar. After a certain time, e.g. 1 minute to 1 hour, preferably after 5 to 30 minutes, the temperature is lowered, e.g. to room temperature.

The desired doped nanoparticulate metal oxides are obtained in form of a sol and can be isolated.

The isolated nanoparticulate oxides preferably have the above defined average particle size for component (a). Thus, a further subject of the present invention is a doped nanoparticulate metal oxide, obtainable by the above described process of the present invention. In a preferred embodiment the doped nanoparticulate metal oxide is ZnO doped with indium. Preferably, the indium content is from 2 to 12 wt.-%, based on the total weight of the oxide. The indium doped zinc oxide preferably is obtained in wurtzite structure, more preferably having a hexagonal P6$_3$mc structure.

In addition to the nanoparticulate metal oxide (component (a1) or (a2)) the composition of the present invention can also comprise a sterically hindered amine (component (b1) or (b2)).

Generally, the term "sterically hindered amine" is known in the art. Sterically hindered amines are a well-known class of organic UV light stabilizers and often referred to as HALS (hindered amine light stabilizer). Examples for suitable sterically hindered amines are as follows:

Bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro-[4,5]decane, a reaction product of 7,7,9,9-tetramethyl-2-cycloundecyl-1-oxa-3,8-diaza-4-oxo-spiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-a-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)-amino)-s-triazine.

In a preferred embodiment the sterically hindered amine of component (b1) is an N-oxygen-substituted sterically hindered amine. In this embodiment the components (b1) and (b2) are the same.

Also the term "N-oxygen-substituted sterically hindered amine" is known in the art. It refers to sterically hindered amines comprising an =N—O— group.

In a particularly preferred embodiment the N-oxygen-substituted sterically hindered amine of components (b1) or (b2) is an N-oxygen substituted sterically hindered amine of the nitroxyl, hydroxylamine, alkoxyamine or hydroxylalkoxyamine class. Preferred N-oxygen substituted sterically hindered amines of the nitroxyl, hydroxylamine, alkoxyamine or hydroxylalkoxyamine class are known in the art and described in WO 03/16388 as component (i). All compounds falling under the description of component (i) in WO 03/16388 are herewith incorporated by reference. In particular, all components described in WO 03/16388 as falling under classes (a') to (m') are incorporated by reference.

In particular, the sterically hindered amine of components (b1) or (b2) is a sterically hindered amine of the nitroxyl, hydroxylamine, alkoxyamine or hydroxylalkoxyamine class which preferably contains at least one active moiety of the formula (I) or (II)

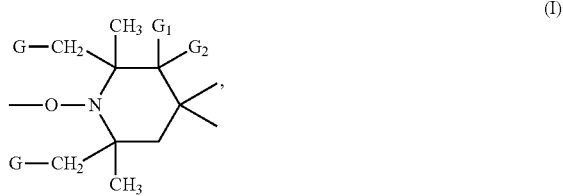

-continued

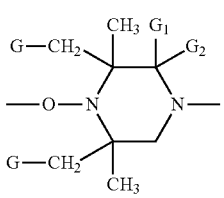
(II)

in which G is hydrogen or methyl, and $G_1$ and $G_2$, independently of one another, are hydrogen, methyl or together are a substituent =O.

Also preferred are sterically hindered amines containing a group of the formula

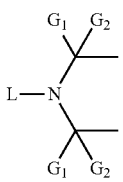

where $G_1$ and $G_2$ are independently alkyl of 1 to 4 carbon atoms or are together pentamethylene, L is O, OH or O-$E_1$; and $E_1$ is $C_1$-$C_{18}$alkyl, $C_5$-$C_{12}$cycloalkyl or $C_7$-$C_{15}$aralkyl; or $E_1$ is $C_1$-$C_{18}$alkyl, $C_5$-$C_{12}$cycloalkyl or $C_7$-$C_{15}$aralkyl each of which is substituted in the aliphatic part by 1-3 OH groups;

or is an oligomeric or polymeric hindered amine molecule made from the reaction of a dialkyl ester or isocyanate with a compound of the formula (I')

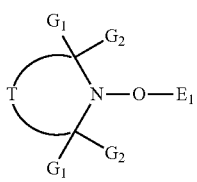
(I')

wherein $G_1$ and $G_2$ are as defined above, and wherein $E_1$ contains 1 OH group and T is —$CH_2$—CH(OH)—$CH_2$—;

or is a simple diester or urethane derivative of a compound of the formula (I) wherein $E_1$ contains 1 OH group and T is —$CH_2$—CH(OH)—$CH_2$—.

The molecular weight of this component usually is in the range 170-10000 g/mol, preferably 500-5000 g/mol (number average as determined by GPC).

Conveniently employed are also sterically hindered amines that contain one or more of the groups of the formula (II')

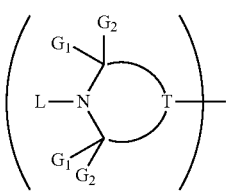
(II')

wherein

T is a group forming a five- or six-membered ring; and L, $G_1$ and $G_2$ are as defined above.

Two or more nitroxyl groups of the above formulae may be present in the same molecule by being linked through the T moiety as exemplified below where E is a linking group:

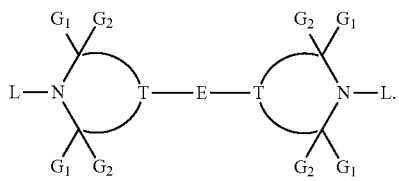

Preferably, $G_1$ and $G_2$ are each methyl.

Of special technical importance are compounds conforming to the above formula when L is O-$E_1$ and $E_1$ is methylene-OH, ethylene-OH, 2-propylene-OH or 2-methyl-2-propylene-OH.

When $E_1$ contains no OH group, it is preferably $C_1$-$C_{18}$alkyl or cyclohexyl.

When $E_1$ contains 1 OH group, it is a carbon-centered radical or diradical formed preferably from 2-methyl-2-propanol, 2-propanol, 2,2-dimethyl-1-propanol, 2-methyl-2-butanol, ethanol, 1-propanol, 1-butanol, 1-pentanol, 1-hexanol, 1-nonanol, 1-decanol, 1-dodecanol, 1-octadecanol, 2-butanol, 2-pentanol, 2-ethyl-1-hexanol, cyclohexanol, cyclooctanol, allyl alcohol, phenethyl alcohol or 1-phenyl-1-ethanol; most preferably from 2-methyl-2-propanol (=tert-butyl alcohol) or cyclohexanol.

When $E_1$ contains 2 OH groups, it is a carbon-centered radical or diradical formed preferably from 1,2-ethanediol, 1,2-propanedial, 1,3-propanediol, 1,2-butanediol, 1,3-butanediol, 1,4-butanediol, 2,2-dimethyl-1,3-propanediol, 1,2-cyclohexanediol, 1,3-cyclohexanediol or 1,4-cyclohexanediol; most preferably from 1,4-butanediol, 2,2-dimethyl-1,3-propanediol, 1,2-cyclohexanediol, 1,3-cyclohexanediol or 1,4-cyclohexanediol.

When $E_1$ contains 3 OH groups, it is a carbon-centered radical or diradical formed from glycerol, 1,1,1-tris(hydroxymethyl)methane, 2-ethyl-2-(hydroxymethyl-1,3-propanediol, 1,2,4-butanetriol or 1,2,6-hexanetriol; most preferably from glycerol, 1,1,1-tris(hydroxy-methyl)methane, 2-ethyl-2-(hydroxymethyl)-1,3-propanediol.

Useful sterically hindered amines can further include those of the general formulas:

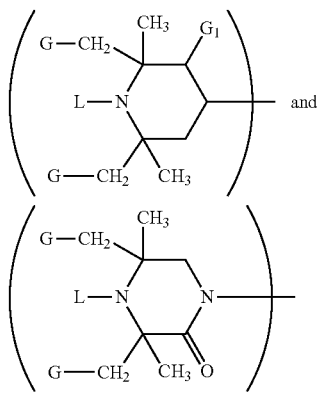

wherein L is as described above and each of G and $G_1$ is independently selected from hydrogen or methyl. Also included are amine oxides containing more than one hindered amine and more than one saturated amine oxide per molecule. Preferred are sterically hindered amines of the alkoxyamine or hydroxyalkoxyamine class, i.e. those wherein L is —O-$E_1$.

Examples for preferred N-oxygen substituted sterically hindered amines are the compounds the reaction product of 2,4-bis[(1-cyclohexyloxy-2,2,6,6-piperidin-4-yl)butylamino]6-chloro-s-triazine with N,N'-bis(3-aminopropyl)ethylenediamine);
1-cyclohexyloxy-2,2,6,6-tetramethyl-4-octadecylaminopiperidine;
bis(1-octyloxy-2,2,6,6-tetramethylpiperidin-4-yl) sebacate;
2,4-bis[(1-cyclohexyloxy-2,2,6,6-tetramethylpiperidin-4-yl)butylamino]-6-(2-hydroxyethylamino-s-triazine;
bis(1-cyclohexyloxy-2,2,6,6-tetramethylpiperidin-4-yl)adipate;
2,4-bis[(1-cyclohexyloxy-2,2,6,6-piperidin-4-yl)butylamino]-6-chloro-s-triazine;
1-(2-hydroxy-2-methylpropoxy)-4-octadecanoyloxy-2,2,6,6-tetramethylpiperidine.

Particularly preferred is the use of Tinuvin NOR371 (triazine derivative) as N-oxygen substituted sterically hindered amine (component (b1) or (b2)).

In the inventive composition component (b1) comprises a sterically hindered amine and/or a polymeric hydroxyphenyltriazine.

Generally, polymeric hydroxyphenyltriazines are known in the art. Usually, the term refers to polymeric compounds comprising at least one hydroxyphenyltriazine group. Preferred embodiments of suitable polymeric hydroxyphenyltriazines are described in WO 2004/104081 which is herewith incorporated by reference.

Preferably, in component (b1) the polymeric hydroxyphenyltriazine is an oligoester or polyester of formula (III)

$$-[A-O-D-O]_x- \quad (III)$$

in which
x is a number from 1 to 50;
A is a group of the formula (IV)

(IV)

or has one of the meanings given for T;

D is $C_4$-$C_{12}$ alkylene or said alkylene substituted by OH or interrupted by O or both substituted by OH and interrupted by O;

L is $C_1$-$C_{18}$alkylene; $C_5$-$C_{12}$cycloalkylene; $C_3$-$C_{18}$alkenylene; or one of said residues substituted by phenyl, $C_7$-$C_{11}$alkylphenyl, $C_5$-$C_{12}$cycloalkyl, OH, halogen, $C_1$-$C_{18}$alkoxy, $C_5$-$C_{12}$cycloalkoxy, $C_3$-$C_{18}$alkenyloxy, COOH;

the $R_1$ are independently of each other H, OR, or OH, with the proviso that at least one of $R_1$ or $R_{13}$ is OH;

the $R_7$ are independently of each other hydrogen, $C_1$-$C_{12}$alkyl or a radical of formula -L-CO—O—$R_9$;

$R_9$ is H, $C_1$-$C_{18}$alkyl, $C_2$-$C_{12}$hydroxyalkyl;

$R_{10}$ is hydrogen, $C_1$-$C_4$alkyl, Cl, phenyl or a group —$OR_7$;

$R_{11}$ is hydrogen or methyl;

$R_{13}$ is hydrogen, methyl, OH or $OR_7$; and

T is the divalent acyl residue of an aliphatic or cycloaliphatic dicarboxylic acid of 13 to 60 carbon atoms;

and which contains at least one moiety of formula (IV) and at least one moiety T.

More specifically, in the above described oligoester or polyester of formula (III)

D is $C_4$-$C_{12}$alkylene or $C_4$-$C_{10}$alkylene interrupted by O;

L is $C_1$-$C_4$alkylene;

T is the divalent acyl residue CO-T'-CO, wherein T' is $C_{20}$-$C_{50}$alkylene or $C_{20}$-$C_{50}$alkylene interrupted by one or more oxygen atoms; or alkylene interrupted by $C_5$-$C_{12}$cycloalkylene or by $C_5$-$C_{12}$cycloalkenylene, each of which is unsubstituted or substituted by alkyl, and T' contains 20-50 carbon atoms in total;

the $R_7$ are hydrogen or methyl;

$R_{10}$ is hydrogen, methyl or a group —$OR_7$;

$R_{11}$ is hydrogen;

$R_{13}$ is hydrogen, OH or methyl.

In a more preferred embodiment the polymeric hydroxyphenyltriazine (component (b1)) is an oligoester or polyester conforming to the formula (IV)

(V)

in which
x is a number from 1 to 20;
the number y is at least 1 and ranges from (x+z−1) to (x+z+1);
z is a number from 1 to 20; and
$R_8$ is hydrogen, $C_1$-$C_{12}$alkyl; $C_5$-$C_{12}$cycloalkyl; $C_2$-$C_{12}$alkenyl; phenyl; $C_7$-$C_{11}$alkylphenyl; $C_1$-$C_{12}$alkyl substituted by phenyl, OH, halogen; $C_1$-$C_{18}$alkoxy, $C_5$-$C_{12}$cycloalkoxy, $C_3$-$C_{18}$alkenyloxy or COOH; especially hydrogen or $C_1$-$C_4$alkyl;
$R_{12}$ is hydrogen or $C_1$-$C_8$alkyl;
$R_{18}$ is hydrogen or $C_1$-$C_4$alkyl;
D is $C_4$-$C_8$alkylene or $C_4$-$C_{10}$alkylene interrupted by O; and
T' is $C_{20}$-$C_{50}$alkylene or $C_{20}$-$C_{50}$alkylene interrupted by one or more oxygen atoms; or
alkylene interrupted by $C_5$-$C_{12}$cycloalkylene or by $C_5$-$C_{12}$cycloalkenylene, each of which is unsubstituted or substituted by alkyl, while T' containing 20-50 carbon atoms in total; and all other symbols are as defined above for the ester of formula I. Preferably, in formula III above x is from the range 2-50, and the number of triazine moieties of the formula II to divalent acid residues T is between 1 to 3 and 10 to 1.

Generally, in the composition of the invention the components (a1) and (b1) or (a2) and (b2) are present in an amount, which is sufficient for the desired UV absorbing properties. In a preferred embodiment the composition of the present invention comprises 10 to 70 weight % of component (a1) or (a2) and 30 to 90 weight % of component (b1) or (b2), more preferably 20 to 45 weight % of component (a1) or (a2) and 55 to 80 weight % of component (b1) or (b2), wherein the given weight percentages refer to the total weight of the composition.

The composition of the present invention can be used as an UV absorber for organic materials. Hence, a further subject of the present invention is the use of a composition comprising
(a1) a nanoparticulate metal oxide selected from oxides of the groups 4 and 12 of the periodic table, wherein the metal oxide is doped with a doping element selected from groups 13, 14 and 17 of the periodic table, preferably selected from In, Ga and/or Al, and and
(b1) an organic UV light stabilizing substance comprising a sterically hindered amine and/or a UV absorbing substance comprising a polymeric hydroxyphenyltriazine or
(a2) a nanoparticulate metal oxide selected from oxides of the groups 4 and 12, and (b2) an organic UV light stabilizing substance comprising an N-oxygen-substituted sterically hindered amine
as an UV absorber for organic materials, preferably for polymers, in particular for organic polymers. The term "UV absorber" means a material being capable of absorbing UV light and stabilizing the organic material, preferably the organic polymer, against its degradation by actinic radiation.

Thus, a further subject of the present invention is polymer comprising the above described UV absorbing composition of the invention.

The polymer of the present invention comprises component (a) (that means either component (a1) or component (a2) or mixtures thereof) in an amount from 0.1 to 3 wt.-%, preferably from 0.3 to 2 wt.-%, and most preferably from 0.5 to 1.5 wt.-%, based on the total weight of the polymer.

In a further preferred embodiment a polymer of the present invention comprises component (b) (that means either component (b1) or component (b2) or mixtures thereof) in an amount from 0.01 to 5 wt.-%, preferably from 0.1 to 4 wt.-%, more preferably from 0.5 to 3 wt.-%, and most preferably from 0.8 to 2 wt.-%, based on the total weight of the polymer.

The polymers of the present invention preferably are optically transparent. In the present application "optically transparent" means that at least 80%, preferably at least 90% and more preferably at least 95% of light in the visible range of 450 nm to 800 nm can pass through.

Moreover, the polymers of the present invention usually are UV absorbing. In the present application "UV absorbing" means that at least 80%, preferably at least 90% and more preferably at least 95% of light in the UV range of 280 nm to 400 nm cannot pass through.

Generally UV absorbtion capacity is determined via UV-VIS spectroscopy. In this application a Perkin Elemer Lamba 35 UV/VIS spectrometer coupled with integration sphere was used.

Generally, the term "polymer" refers to all kinds of thermoplastic polymeric materials, wherein organic polymers are preferred. The following organic polymers can be used:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
 a) radical polymerisation (normally under high pressure and at elevated temperature).
 b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (Du-Pont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(a-methylstyrene).

6. Aromatic homopolymers and copolymers derived from vinyl aromatic monomers including styrene, a-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or a-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

22. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

23. Blends of the aforementioned polymers (polyblends), for example PP/EPDM, Poly-amide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

In a preferred embodiment polyethylene is used, wherein LDPE is particularly preferred. It is also preferred that the polymer of the present invention consists of polyethylene as polymeric substrate.

Besides the above mentioned UV absorbing composition comprising the components (a) and (b) the polymers of the present invention additionally can comprise further additives.

Examples of suitable additives are described below.

1. Antioxidants selected from alkylated monophenols, alkylthiomethylphenols, hydroquinones and alkylated hydroquinones, tocopherols, for example α-tocopherol, β-tocopherol, γ-tocopherol, δ-tocopherol and mixtures thereof (vitamin E), hydroxylated thiodiphenyl ethers, alkylidenebisphenols, O-, N- and S-benzyl compounds, hydroxybenzylated malonates, aromatic hydroxybenzyl compounds, triazine compounds, benzylphosphonates, acylaminophenols, esters of b-(3,5-di-tert-butyl-4-hydroxyphenyl)propionic acid with mono- or polyhydric alcohols, esters of β-(5-tert-butyl-4-hydroxy-3-methylphenyl)propionic acid with mono- or polyhydric alcohols, esters of β-(3,5-dicyclohexyl-4-hydroxyphenyl)propionic acid with mono- or polyhydric alcohols, esters of 3,5-di-tert-butyl-4-hydroxyphenyl acetic acid with mono- or polyhydric alcohols, amides of β-(3,5-di-tert-butyl-4-hydroxyphenyl)propionic acid, ascorbic acid (vitamin C), aminic antioxidants or mixtures thereof.

2. UV absorbers and light stabilizers selected from 2-(2'-Hydroxyphenyl)benzotriazoles (for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-meth-oxycarbonylethyl)phenyl)benzotriazole, 2-(3'-tert-butyl-2'-hydroxy-5'-(2-octyloxycarbonyl-ethyl)phenyl)benzotriazole, 2-(3'-tert-butyl-5'-[2-(2-ethylhexyloxy)carbonylethyl]-2'-hydroxy-phenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole), further 2-Hydroxybenzophenones, esters of substituted and unsubstituted benzoic acids, acrylates, nickel compounds, oxamides, 2-(2-hydroxyphenyl)-1,3,5-triazines, or mixtures thereof.

3. Metal deactivators, for example N,N'-diphenyloxamide.

4. Phosphites and phosphonites, for example triphenyl phosphite, tris(2,4-di-tert-butylphenyl)phosphite (Irgafos®168, Ciba Specialty Chemicals Inc.), tris(nonylphenyl)phosphite or mixture thereof.

5. Hydroxylamines, for example N,N-dibenzylhydroxylamine.

6. Nitrones, for example, N-benzyl-alpha-phenylnitrone.

7. Thiosynergists, for example dilauryl thiodipropionate.

8. Peroxide scavengers, for example esters of β-thiodipropionic acid.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

One or more of these further additives are usually contained in an amount of 0.01 to about 10 wt.-%, preferably in an amount of 0.1 to 5 wt.-%, more preferably in an amount of 0.5 to 3 wt.-%, based on the total weight of the polymer.

In a preferred embodiment Tinuvin 326 (2-(2-hydroxy-3-t-butyl-5-methylphenyl)-5-chlorobenzotriazole) is used as an additional additive, preferably in an amount of 0.5 to 1.0 wt.-%, based on the total weight of the polymer.

The polymers of the present invention can be used in technical application fields such as architectural glazing, glazing in building and construction, automotive glazing, transportation glazing, agricultural films and structures. The materials may be solid sheets, monolithic sheets, twin-wall sheets, multi-wall sheets, flat sheets, corrugated sheets, films, oriented or mono- or biaxially oriented films, lamination films, capstock films. Specific application fields include wintergarden and veranda buildings, facades, skylights, pool covers and enclosures, roof structures, vaults, walkways, shelters, signage, interior and exterior design elements, sun shades, side window, rear window, panorama roof, greenhouses.

Thus, further subjects of the present invention are an agricultural film and an packaging film comprising a polymer of the present invention.

Specific application fields of agricultural films are greenhouses, small tunnel, mulch films, silage films, bale wrap, nettings and non woven. Preferred polymers are Polyethylene low density (LDPE), Polyethylene linear-low density (LLDPE) and/or Ethyl-Vinyl Acetate copolymers. The films usually comprise a monolayer or a co-extruded layer. The thickness of the films usually varies from 50 to 200 micrometers.

Polymers of the present invention are also suitable for packaging articles production. The term packaging encompasses containers, wrappers and the like for enclosing a product (i.e. food products or manufactured products, spare parts etc.) and closures such as lids for such containers or wrappers. Commonly used polymers are polyester, polyamides, polyolefines (PP, PE) and copolymers of ethylene and vinyl alcohol, vinylidene chloride, and vinyl choride. Thickness of films used for packaging could vary for example from 50 micrometers to 500 micrometers, preferably from 70 to 200 micrometers.

The incorporation of the UV absorbing composition (comprising components (a) and (b)) and optional further components into the polymer is carried out by known methods such as dry blending in the form of a powder, or wet mixing in the form of solutions, dispersions or suspensions for example in an inert solvent, water or oil. The UV absorbing composition and optional further additives may be incorporated, for example, before or after molding or also by applying the dissolved or dispersed composition to the polymer material, with or without subsequent evaporation of the solvent or the suspension/dispersion agent. The composition may be added directly into the processing apparatus (e.g. extruders, internal mixers, etc), e.g. as a dry mixture or powder or as solution or dispersion or suspension or melt.

The incorporation can be carried out in any heatable container equipped with a stirrer, e.g. in a closed apparatus such as a kneader, mixer or stirred vessel. The incorporation is preferably carried out in an extruder or in a kneader. It is immaterial whether processing takes place in an inert atmosphere or in the presence of oxygen.

The addition of the composition to the polymer can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing.

Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffex-trusion, Vol.* 1 *Grundlagen*, Editors F. Hensen, W. Knappe, H. Potente, 1989, pp. 3-7, ISBN:3-446-14339-4 (*Vol.* 2 Extrusionsanlagen 1986, ISBN 3-446-14329-7). For example the screw length is 1-60 screw diameters, preferably 20-48 screw diameters. The rotational speed of the screw is preferably 1-800 rotations per minute (rpm), very particularly preferably 25-400 rpm.

The additives of the invention and optional further additives can also be added to the polymer in the form of a masterbatch ("concentrate") which contains the composition comprising components (a) and (b) and optionally further additives in a concentration of 1% to 40% and preferably 5% to about 20% by weight, based on the total weight of the concentrate.

The invention is illustrated by the following examples. Percentages are by weight, if not indicated otherwise.

EXAMPLES

Example 1

Film Manufacture 1

A certain amount of below described masterbatches were introduced by means of a turbo mixer (Caccia, Labo 10) with LDPE (Riblene FF-29) having a melt index of 0.6 g/10 min. (190° C./2.16 Kg) in pellet form. The mixture was converted to a film 200 μm thick film, using a blow-extruder (Dolci) working at a maximum temperature of 210° C.

Masterbatch A ("MB A") was used, which is a 15% Masterbatch containing 12% of Ciba® Tinuvin NOR371 (an N-oxygen substituted sterically hindered amine) and 3% of Tinuvin326; in the polymer formulations the resulting concentration of the two additives is: 0.4% Ciba® Tinuvin NOR371 and 0.1% Ciba® Tinuvin 326.

"MB 1A" and "MB 2A" were masterbatches comprising non-doped nanoparticulate $TiO_2$, having particle sizes as described below. "MB3" was a masterbatch of In doped nanoparticulate $TiO_2$ having a particle size as described below.

All master batches were concentrates in LDPE.

In the following table the average particle size of the samples of $TiO_2$ is reported.

| Masterbatch | Average Particle size (nm) |
| --- | --- |
| 1A | 280-290 |
| 2A | 90-100 |
| 3A | 90-110 |

Using Masterbatches A, 1A, 2A and 3A the following formulations 1 to 4 were made.

| Formulation | Amount of MB A (g) | | Amount of 10% MB 1A | | Amount of 10% MB 2A | | Amount of 10% MB doped 3A | | Amount of LDPE (g) |
| --- | --- | --- | --- | --- | --- | --- | --- | --- | --- |
| | g | nt.-% | g | nt.-% | g | nt.-% | g | nt.-% | |
| 1 | 333.3 | 3.3 | — | — | — | — | — | — | 9566.7 |
| 2 | 333.3 | 3.3 | 100 | 1 | — | — | — | — | 9566.7 |
| 3 | 333.3 | 3.3 | — | — | 100 | 1 | — | — | 9566.7 |
| 4 | 333.3 | 3.3 | | | | | 100 | 1 | 9566.7 |

Example 2

Performance Results

The performance of 200 micron LDPE films obtained from formulations 1 to 4 of example 1 were assessed upon natural (outdoor station placed in Bologna, Italy) and artificial aging (ATLAS Weatherometer model Ci65A, equipped with a 6500W Xenon lamp (continuous light cycle, black panel temperature=63° C.)) in the presence of burned sulphur or sulphur containing pesticides; mechanical properties in function of the exposure time were monitored.

The results were given in the table below.

| Pesticide treatment | Formulation | Time to 50% Elongation at break (KLys) |
|---|---|---|
| Burned sulphur | 1 | 145 |
| " | 2 | 170 |
| " | 3 | 210 |
| " | 4 | 230 |
| Sulphur based pesticide (Vapam) | 1 | 252 |
| Sulphur based pesticide (Vapam) | 2 | 294 |
| Sulphur based pesticide (Vapam) | 3 | 325 |
| Sulphur based pesticide (Vapam) | 4 | 350 |

From the results above it is clear that incorporating an inorganic UV absorber in nanoparticulate form together with a N-oxygen substituted HALS, increases remarkably the film resistance to aging even in the presence of severe sulphur treatment; the performance is even more improved when the light stabilizer is combined with a doped nanoparticulate metal oxide.

Example 3

Film Manufacture 2

In a turbo mixer (Caccia, Labo 10) certain amount of additives, as reported in the table below, were mixed with LDPE Riblene FF-29 having a melt index of 0.6 g/10 min. (190° C./2.16 Kg). The mixture was extruded at a maximum temperature of 200° C. using an O.M.C. twin-screw extruder (model ebv 19/25) to granules, which were subsequently converted to a film 150 μm thick film, using a laboratory scale blow-extruder (Formac) working at a maximum temperature of 210° C.

| Formulation | Nano-particulate metal oxide | Doping | Amount of Nano-particulate metal oxide g | % | Amount of N-oxygen substituted HALS g | % | Amount of LDPE |
|---|---|---|---|---|---|---|---|
| 5 | ZnO | none | 7.5 | 0.5 | 12 | 0.8 | 1480.5 |
| 6 | 4A | Al | 7.5 | 0.5 | 12 | 0.8 | 1480.5 |
| 7 | 5A | Al | 7.5 | 0.5 | 12 | 0.8 | 1480.5 |
| 8 | 6A | Ga | 7.5 | 0.5 | 12 | 0.8 | 1480.5 |

The particle size distribution of the various UV absorbers is reported in the table below:

| UVA | Particle size (nm) |
|---|---|
| 4A | 20-40 |
| 5A | 120-200 |
| 6'A | 20-40 |
| ZnO | 90-110 |

It can be seen from the tables above that formulation 5 comprises non-doped ZnO whereas formulations 6-8 comprise doped nanoparticulate ZnO. The difference between formulations 6 and 7 is the particle size of the doped nanoparticulate ZnO.

Example 4

Performance Results

The performance of the 150 micron LDPE films has been assessed upon artificial aging (ATLAS Weatherometer (model Ci65A) equipped with a 6500W Xenon lamp (continuous light cycle, black panel temperature=63° C.)); carbonyl increment (peak at 1710 cm-1 with a FT-IR Perkin-Elmer Spectrum One) in function of the exposure time was monitored.

| | Carbonyl increment | | |
|---|---|---|---|
| Formulation | 565 hours of WOM | 3010 hours of WOM | 8045 hours of WOM |
| 5 | 0 | 0.03 | 0.08 |
| 6 | 0 | 0.02 | 0.05 |
| 7 | 0 | 0.02 | 0.08 |
| 8 | 0 | 0.02 | 0.05 |

It can be seen that formulations 5 and 7 are particularly stable against artificial aging.

Example 5

Preparation of In Doped ZnO

All chemicals are from Sigma Aldrich and used as such if not otherwise specified.

Reaction Scheme

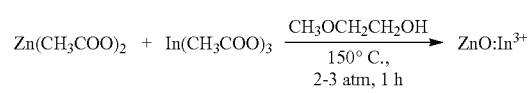

14.0 g of $(CH_3CO_2)_2Zn$ and 1.13 g of $In(CH_3CO_2)_3$ were dissolved in 166 ml of methoxyethanol (>99.5%) within the autoclave apparatus. The temperature was raised till 150° C. and the developed pressure is about 2 bar. Once the temperature was set, the mixture was left for an hour at such a temperature and then lowered to room temperature. The obtained sol was bluish and stable. Straight after the end of the reaction, a sample was taken for DLS analysis. The crude product is dried by evaporation of the solvent and subsequently by one or more thermal treatment(s) within a rotary kugelrohr oven set to 150° C. for 19 hours.

Example 6

Characterization of In Doped ZnO

In doped ZnO (IZO) was produced according to example 5, wherein the In content was 2, 6 and 12 wt.-%. The respective samples were designated as IZO-M2, IZO-M6 and IZO-M12, respectively.

The table below summarize DLS data on In doped samples and indicated that the average particle diameter of suspensions depends both on the used solvent and on the In content. In general, as indicated by the polydispersity index (PI), the size distribution is closely related to the average particle diameter: the larger the particle diameter, the broader the particle size distribution. Moreover, the use of methoxyethanol as a solvent allows a better control of particle size, probably due to its higher complexation and stabilization ability compared to ethanol (different samples have also been produced in ethanol), while increasing the indium content leads to particles with larger dimensions.

| Sample | Solvent | In w/w % | Particle size nm | PI |
|---|---|---|---|---|
| IZO-M0 | MET | 0 | 60 | 0.072 |
| IZO-M2 | MET | 2 | 48 | 0.055 |
| IZO-M6 | MET | 6 | 47 | 0.107 |
| IZO-M12 | MET | 12 | 59 | 0.147 |

The XRD patterns of the ZnO based samples synthesised in methoxyethanol at increasing In loadings are shown in FIG. 1.

Powders as obtained are crystalline and show a stable wurtzite structure. All reflections were assigned to hexagonal P6$_3$mc structure of ZnO and are indexed on the basis of JCPDS card No. 36-1451. No phase corresponding to indium oxide or other compounds was detected. The peak width of doped nanoparticles is much broader than that of undoped materials, indicating a lattice distortion due to the indium introduction. It is noticed that the most significant broadening takes place with the higher dopant content. This result clearly indicates the influence of the In atoms on the formation of ZnO crystallites.

The grain size of the powders were calculated using the Scherrer formula $D=(0.9\lambda)/[(\beta')\cos\theta]$ where D represents the diameter of the crystallites, $\lambda$ is the wavelength of CuK$\alpha$ line. $\beta'$ is the FWHM of the reflection at a given 2$\theta$ Bragg angle cleaned for the instrumental broadening $[(\beta^2-\beta_{st}^2)^{-1/2}]$ where $\beta$ represents the FWHM of the measured reflection in the sample and $\beta_{st}$ is the FWHM of a suitable reflection of a strain free sample with very large crystallites, in the same 2$\theta$ region.

The grain size was found to decrease with increasing In loading, as reported in the table below.

| | Grain Size (nm) vs plane | | | | | |
|---|---|---|---|---|---|---|
| Sample | 100 | 002 | 101 | 102 | 110 | 103 |
| IZO-M0 | 23 | 22 | 22 | 20 | 21 | 19 |
| IZO-M2 | 18 | 15 | 17 | 9 | 17 | 15 |
| IZO-M6 | 18 | 6 | 12 | 9 | 15 | 7 |
| IZO-M12 | 16 | 3 | 11 | 7 | 13 | 5 |

In particular, such grains decrease is more consistent along some lattice plane (i.e. 002, 102 and 103). Taking into account the grain dimensions a and c respectively from the (100) and (002) diffraction peaks, these data seems to indicate that the products formed in absence of dopant were spherical or ellipsoidal grains, with average diameters of 15-20 nm. On the contrary, the presence of indium favours the formation of rods, grown preferentially along the a axis. In fact, the estimation of the crystallite size at increasing In content was constant along that direction, while in the c direction decreases from 20 nm to 3 nm. This means that the crystal growth of wurtzite ZnO in the c direction was highly inhibited by indium introduction. On the basis of cell parameters refinements, it is possible to observe a modification of the primitive cell volume as a function of In loading.

Figure 2:
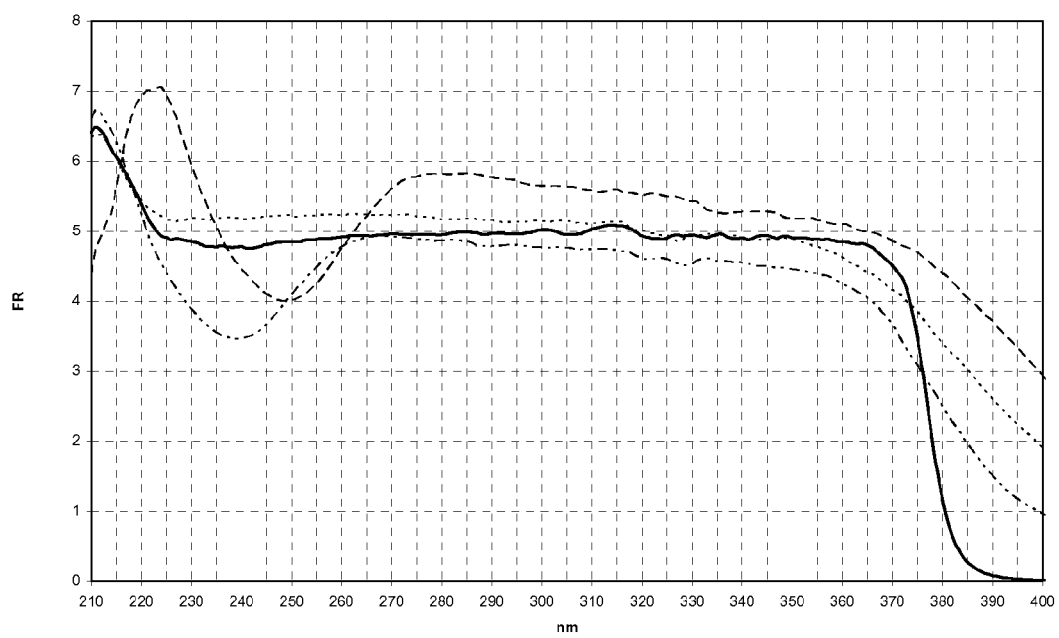
FIG. 2: Powder diffuse reflectance analysis of an undoped commercially available sample of ZnO (straight line, —), and 3 differently doped ZnO samples: 2% In-doped ZnO (dotted interrupted line, —·—·—), 6% In-doped ZnO (interrupted line, — — —), and 12% In-doped ZnO (dotted line, ·····).

FIG. 2 shows powder diffuse reflectance analysis of an undoped commercially available sample of ZnO (straight line, -), and 3 differently doped ZnO, prepared according to the above procedure:
2% In-doped ZnO (dotted interrupted line, _ _ _ _ _ _),
6% In-doped ZnO (interrupted line, (— — — —) and 12% In-doped ZnO (dotted line, ____).

Example 7

Preparation of Ga Doped ZnO

Ga(NO$_3$)$_3$.xH$_2$O was dried in a kugelrohr oven set to 150° C. for 8H (15 mmHg) and a coulometric water determination was performed (water content: 12.23%). This material was the gallium precursor in use.

The autoclave apparatus is a 300 ml capacity hasteloy C22 water cooled by a thermostatic unit Julabo 5HC. The experiments were repeated successfully within a 250 ml capacity steel autoclave, paired by a silicon oil Haake thermostatic unit.

The kugelrohr oven was a rotary Büchi apparatus equipped with a vacuum pump, functioning at 15 mmHg.

8.42 g of (CH$_3$CO$_2$)$_2$Zn and 1.15 g of Ga(NO$_3$)$_3$.xH$_2$O were dissolved in 100 ml of methoxyethanol (>99.5%) within the autoclave apparatus. The temperature was raised till 150° C. and the developed pressure is about 2 bar. Once the temperature was set the mixture was left for 15 minutes at such a temperature and then lowered to room temperature. The obtained sol was milky and stable. Straight after the end of the reaction, a sample was taken for DLS analysis. The crude product is dried by evaporating the solvent and subsequently by one or more thermal treatment(s) within a rotary kugelrohr oven set to 150° C. for 19 hours.

The invention claimed is:

1. An agricultural film, comprising:
a thermoplastic polymer film;
(a1) a nanoparticulate metal oxide selected from TiO$_2$ and ZnO, wherein the nanoparticulate metal oxide is doped with In; and
(b1) an N-oxygen-substituted sterically hindered amine,
wherein (a1) is present in an amount of 0.1 to 3 wt.-%, based on the total weight of the polymer,
wherein (b1) is present in an amount of 0.1 to 4 wt.-%, based on the total weight of the polymer, and
wherein the average particle size of the nanoparticulate metal oxide is from 90 nm to 110 nm.

2. The agricultural film of claim 1, wherein the average particle size of the nanoparticulate metal oxide is from 90 nm to 100 nm.

3. The agricultural film of claim 1, wherein the nanoparticulate metal oxide (a1) has an In content of 3 to 12 wt.-%, based on the total weight of the nanoparticulate metal oxide.

4. The agricultural film of claim 1, wherein the sterically hindered amine (b1) is an N-oxygen substituted sterically hindered amine of the nitroxyl, hydroxylamine, alkoxyamine or hydroxyalkoxyamine class.

5. The agricultural film of claim 4, wherein the sterically hindered amine (b1) is a compound comprising a group of formula (I) or (II):

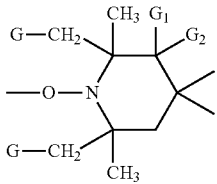

(I)

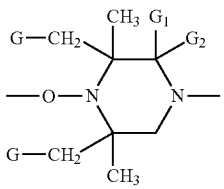

(II)

wherein:
G is hydrogen or methyl; and
$G_1$ and $G_2$ are each independently hydrogen or methyl, or together $G_1$ and $G_2$ are a substituent =O, and wherein the compound has a molecular weight from the range 170 g/mol to 10000 g/mol.

6. The agricultural film of claim 1, wherein the nanoparticle metal oxide (a1) is In doped $TiO_2$.

7. The agricultural film of claim 1, which transmits at least 80% of light in the visible range of 450 nm to 800 nm and which absorbs at least 80% of light in a wavelength range from 280 nm to 400 nm.

8. The agricultural film of claim 1, wherein the nanoparticle metal oxide (a1) is In doped ZnO.

9. The agricultural film of claim 1, wherein the thermoplastic polymer is polyethylene.

10. The agricultural film of claim 9, wherein the film is from 50 to 200 microns thick.

11. The agricultural film of claim 1, wherein the nanoparticle metal oxide (a1) is In doped $TiO_2$ with an average particle size of 90 to 100 nm.

12. The agricultural film of claim 1, wherein (b1) is present in an amount of 0.5 to 3 wt.-%, based on the total weight of the polymer.

13. The agricultural film of claim 1, wherein the content of In in the nanoparticulate metal oxide (a1) is from 4 to 10 wt.-%, based on the total weight of the nanoparticulate metal oxide.

* * * * *